US005804765A

United States Patent [19]
Siemon et al.

[11] Patent Number: 5,804,765
[45] Date of Patent: Sep. 8, 1998

[54] CABLE MANAGEMENT ENCLOSURE

[75] Inventors: John A. Siemon, Woodbury; Michael J. Gesmondi, Thomaston; Robert C. Carlson, Jr., Torrington, all of Conn.; Conrad L. Ott, Port Jefferson Station, N.Y.

[73] Assignee: The Siemon Company, Watertown, Conn.

[21] Appl. No.: 652,852

[22] Filed: May 23, 1996

[51] Int. Cl.$^6$ .................................................. H01R 23/02
[52] U.S. Cl. .......................... 174/65 R; 174/66; 174/135
[58] Field of Search .................................. 174/65 R, 67, 174/66, 53, 135; 385/135

[56] References Cited

U.S. PATENT DOCUMENTS

| | | | |
|---|---|---|---|
| 4,840,449 | 6/1989 | Ghandeharizadeh ..................... | 385/135 |
| 4,850,901 | 7/1989 | Smith et al. .............................. | 439/676 |
| 5,038,000 | 8/1991 | Westbrook et al. ..................... | 174/52.1 |
| 5,167,001 | 11/1992 | Debortoli et al. ....................... | 385/135 |
| 5,477,010 | 12/1995 | Buckshaw et al. ....................... | 174/67 |
| 5,486,650 | 1/1996 | Yetter ........................................ | 174/53 |
| 5,594,206 | 1/1997 | Klas et al. ................................. | 174/56 |

OTHER PUBLICATIONS

MOD–TAP Product Catalog, page for Fiber Optic Outlets, date unknown.
AMP Product Catalog, p. 69 and Diagram, date unknown.
ORTRONICS Open System Architecture Advertisement, 1996.
Teleconnect, May 1996, Tools and Test Equipment, Siecor Product Review.
SIECOR Product Catalog, pp. 2.44 and 2.45, *Ruggedized Information Outlet (RIO)*, date unknown.

*Primary Examiner*—Hyung S. Sough
*Assistant Examiner*—Joseph Waks
*Attorney, Agent, or Firm*—Fishman, Dionne, Cantor & Colburn

[57] ABSTRACT

A cable management enclosure for providing neat, organized installation of cable (such as fiber optic or copper) and providing easy access to the cable for maintenance. The cable management enclosure provides an area for managing cabling at the work area (an area located close in proximity to the station equipment, which includes telephones, data terminals, and computers) by providing a connection point for 2, 4, or 6 fiber connectors utilizing slide-in adapter panels. There are also provisions for copper connections with the integration of a single-gang faceplate which can be mounted directly to the cable management enclosure cover to accommodate up to 6 modular jacks. The base of the cable management enclosure provides incoming fiber cable strain relief plus storage and management of up to 1 meter of slack for as many as 6 fibers. A cover snaps onto the base to provide dust-proofing and protection for the fibers. A concealed cover-to-base screw accommodation is included for added security if desired. Molded-in icon pockets permit fiber port identification with the use of color-coded, snap-in icons.

20 Claims, 14 Drawing Sheets

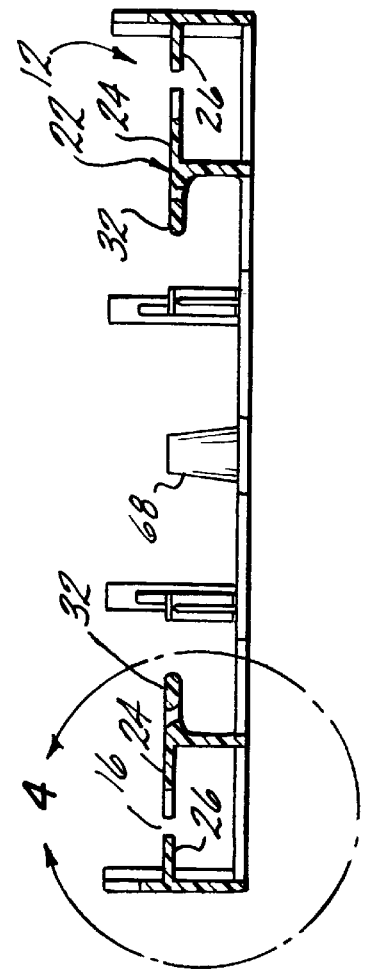
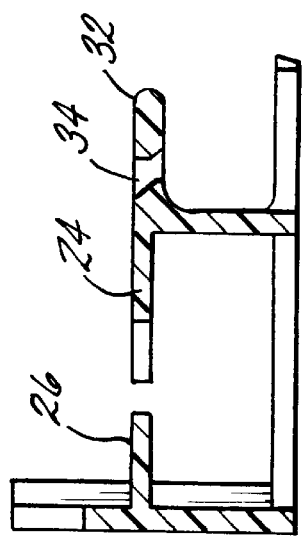

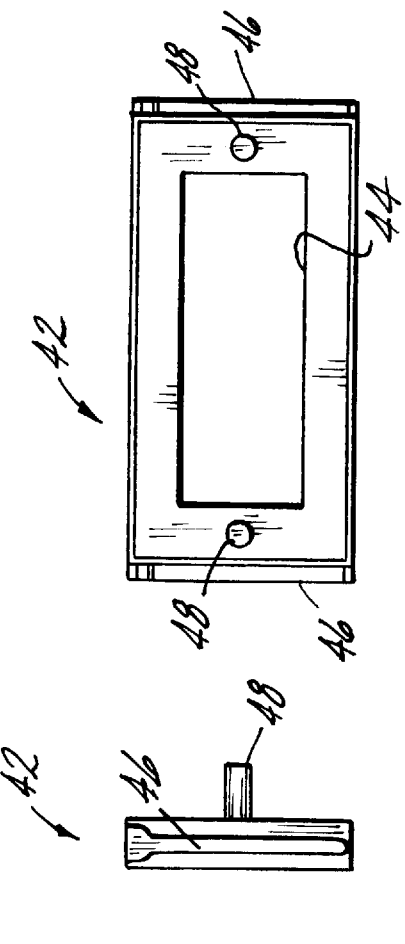
FIG. 8
FIG. 7
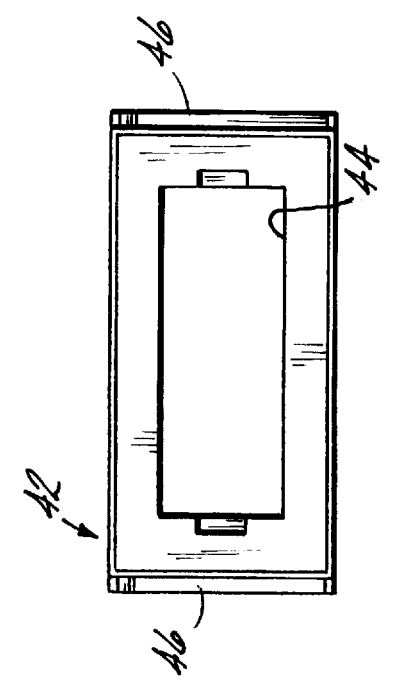
FIG. 6

CABLE MANAGEMENT ENCLOSURE

BACKGROUND OF THE INVENTION

1. Field of the Invention

The invention relates generally to cable enclosures and in particular to a wall mounted cable management enclosure that provides for neat, organized installation and provides easy access to the cable for maintenance.

2. Prior Art

To deliver cable (such as fiber or copper) to the desk, an outlet box or enclosure is desired to provide a connection point within the work area for as many as 6 fibers and also be able to integrate copper connections as well. There are not many suppliers of such a box and those that do exist are inadequate in one way or another. Amp, Inc. has multimedia outlet sold under the brand name Hideout. Its primary shortcomings are lack of fiber slack storage/management, density limitations (4 fiber or 2 fiber/4 copper), and lack of fiber port identification. The Amp multimedia outlet has identification areas for each duplex pair of fiber ports, but does not provide an identification area for each individual port.

Siecor Corporation produces an enclosure sold under the brand name Ruggedized Information Outlet (RIO). Its primary shortcomings are its large size (height, width, and depth), density limitations (4 fiber/4 copper), lack of fiber port identification areas, and high cost.

Mod-Tap, Inc. produces an enclosure sold under the brand name Passport Fiber Plate. Its primary drawbacks are its difficulty to load fiber slack so as to maintain good fiber management, lack of space to properly manage the fiber coils in proximity to the connectors/adapters, and density limitations (6 fiber or 4 fiber/2 copper).

SUMMARY OF THE INVENTION

The above-discussed and other drawbacks and deficiencies of the prior art are overcome or alleviated by the cable management enclosure of the invention. This low-profile cable outlet box provides an area for managing cabling at the work area (an area located close in proximity to the station equipment, which includes telephones, data terminals, and computers) by providing a connection point for 2, 4, or 6 fiber connectors utilizing slide-in adapter panels. There are also provisions for copper connections with the integration of a single-gang faceplate which can be mounted directly to the cable management enclosure cover to accommodate up to 6 modular jacks. The base of the cable management enclosure provides incoming fiber cable strain relief plus storage and management of up to 1 meter of slack for as many as 6 fibers. A cover snaps onto the base to provide dust-proofing and protection for the fibers. A concealed cover-to-base screw accommodation is included for added security if desired. Molded-in icon pockets permit fiber port identification with the use of color-coded, snap-in icons.

BRIEF DESCRIPTION OF THE DRAWINGS

Referring now to the drawings wherein like elements are numbered alike in the several FIGURES:

FIG. 3 is a cross-sectional view taken along line 3—3 in FIG. 1;

FIG. 4 is an enlarged view of a portion of the base shown in FIG. 3;

FIG. 6 is a front plan view of a slide-in adapter plate for use with the base of the cable management enclosure;

FIG. 7 is a side plan view of the slide-in adapter plate shown in FIG. 6;

FIG. 8 is a rear plan view of the slide-in adapter plate shown in FIG. 6;

DETAILED DESCRIPTION OF THE INVENTION

Figure 1:
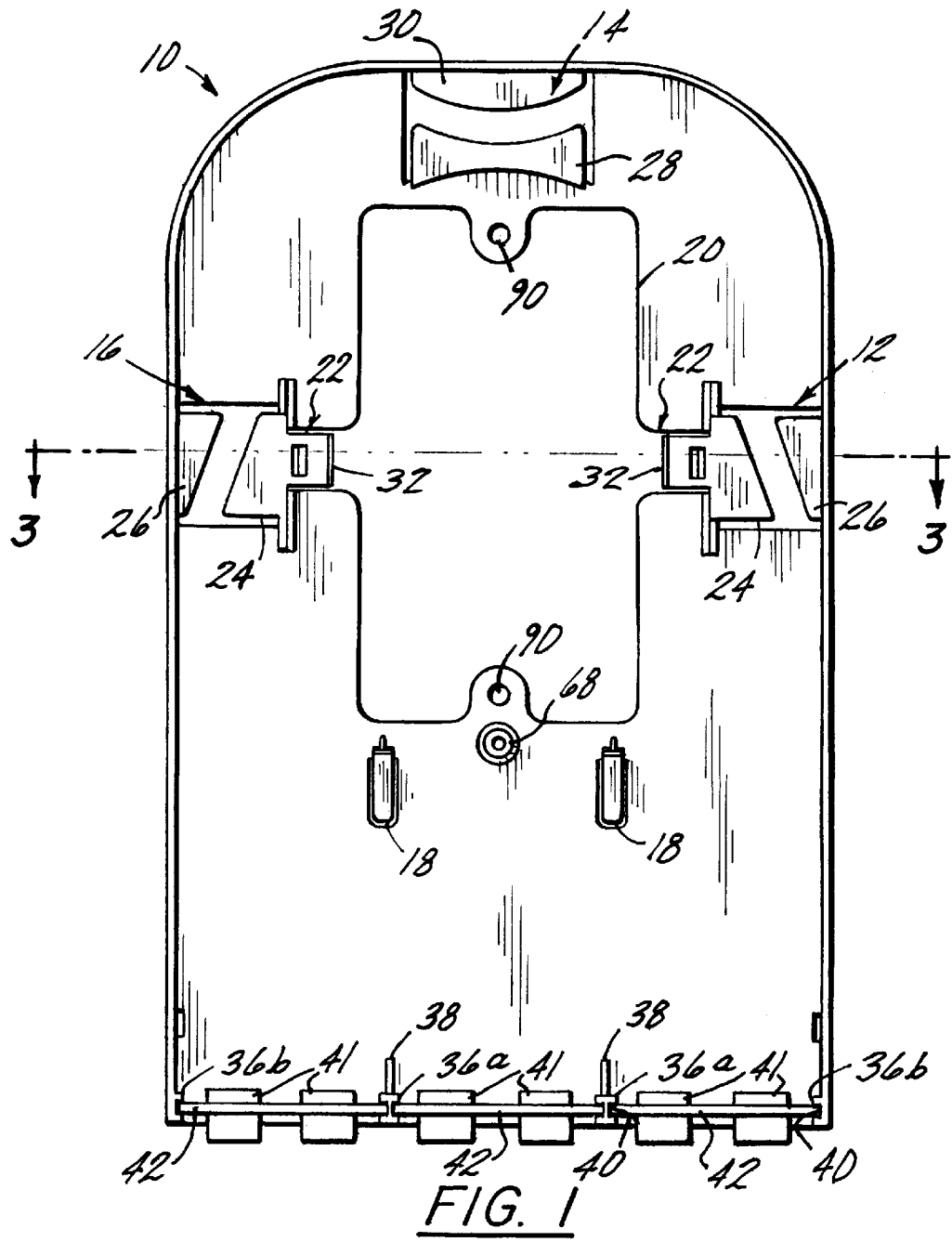
FIG. 1 is a top plan view of the base of the cable management enclosure.
Figure 2:
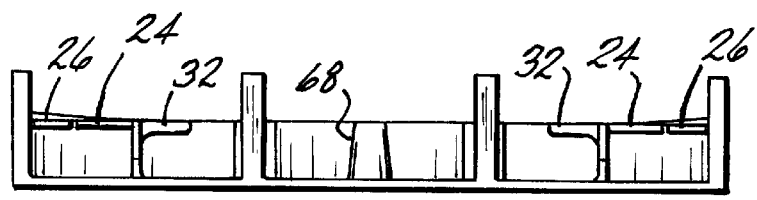
FIG. 2 is a front plan view of the base.
Figure 5:
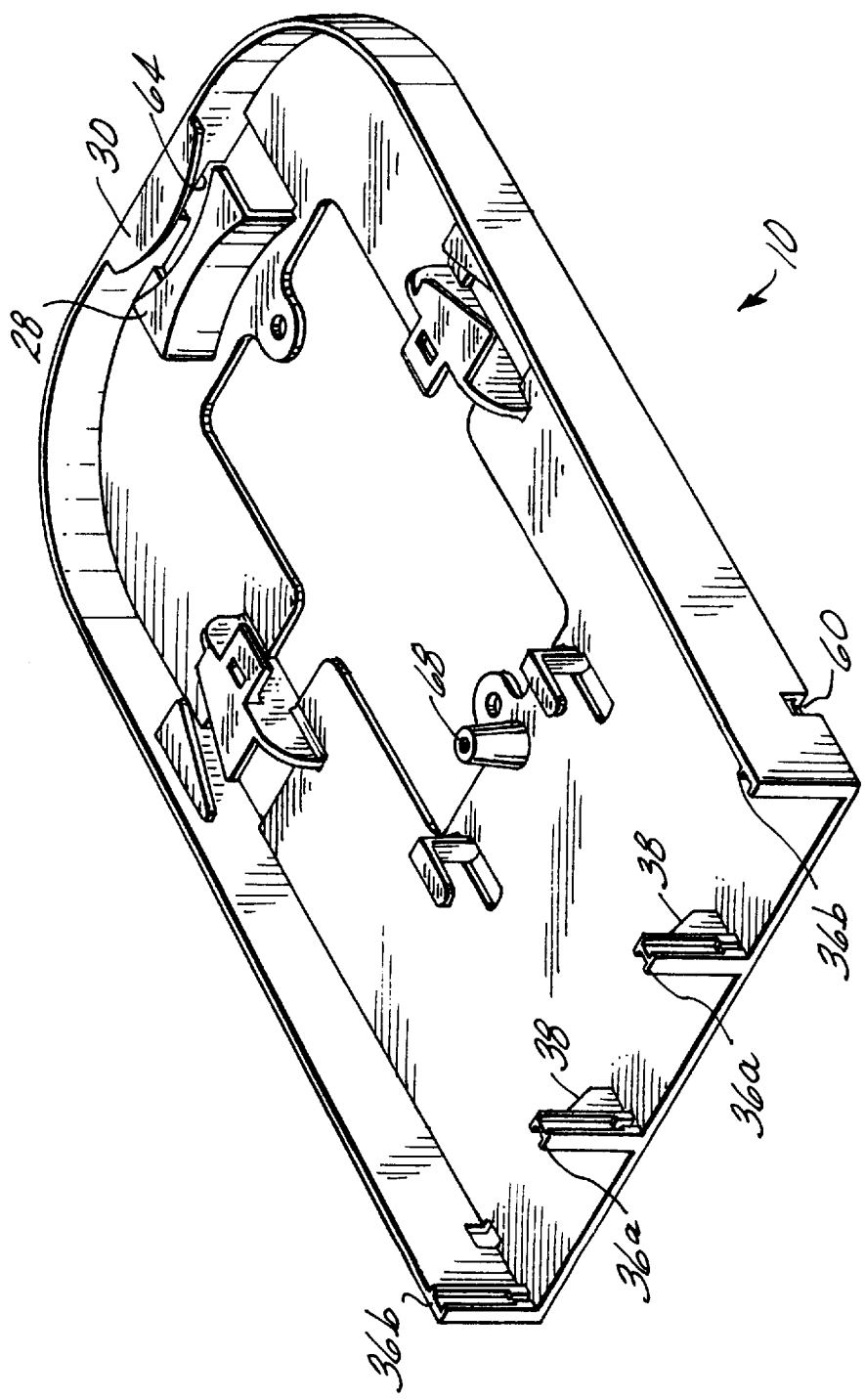
FIG. 5 is a perspective view of the base of the cable management enclosure.

FIG. 1 shows the base of the cable management enclosure shown generally at 10. A pair of holes 90 are formed in the base 10 to provide for mounting the base 10 to a wall box (not shown). The base 10 includes four cable retainers shown generally at 12, 14, 16 and 18 molded within the base 10 which are designed to not only retain the coiled fiber slack effectively when mounted to a wall, but also to facilitate the coiling of cable entering the base. Cable retainers 12 and 14 have an inner angled plate 24 and an outer angled plate 26. Each plate has one edge that forms an oblique angle with at least one other edge of the plate. The plates 24 and 26 are positioned above the base of the cable management enclosure as shown in FIG. 2. A space is provided between plates 24 and 26 to allow insertion of cable into the cable retainers 12 and 16. By using two plates 24 and 26, the cable is held in the cable retainer efficiently. Cable retainer 14 has an inner curved plate 28 and an outer curved plate 30 A space is provided between plates 28 and 30 to allow insertion of cable into the cable retainer 14. The plates 28 and 30 are positioned above the base of the cable management enclosure as shown in FIG. 5. Cable retainers 18 are L-shaped brackets having a top surface positioned above the base of the cable management enclosure as shown in FIG. 5. This provides a space for insertion of the cable into the cable retainer 18. The direction of the angle of cable retainers 12 and 16 and the curve of cable retainer 14 allow the cable (such as fiber or copper) to be easily loaded in a coiled state. Note that the cable retainers enclose the cable such that the coiled loops of cable resist gravity; and thus cannot slide towards the bottom of base 10.

The incoming cable (from within the wall of the building) is inserted into the box through a central opening 20 formed in the base 10. The cable should be secured to the base in some manner to enable the cable slack coiling/management to begin from an effective starting point and for the cable, once coiled, to remain in that state. The cable is initially connected to the base through a cable tie down shown generally at 22. Two cable tie downs 22 are provided for allowing access to the cable management enclosure from plural directions. It is understood that any number of cable tie downs may be used and the placement of the cable tie downs 22 is not limited to that shown in FIG. 1. As shown in FIG. 3, each cable tie down 22 includes a cable tie-down shelf 32 molded directly onto the centralized cable retainers 12 and 16 which is the most effective point for initiating the cable coiling into the cable retainers from either the top or bottom of base opening 20. The tie down shelf 32 central location also facilitates the cable tie-down as opposed to being located at the corners, top, or bottom of base opening. The tie down shelf 32 provides a generous plane to easily affix a large diversity of cable types and sizes and its position relative to the surface of the base also allows abundant space to enable easy loading of that same diversity of cable type/size.

The tie down shelf 32 includes an angled cable tie retention slot 34 which is molded into the cable tie-down shelf 32 and provides for easy installation of any of a variety of industry-standard cable ties. There is an opening 20 (shown in FIG. 1) in the base that is located directly below the tie down shelf 32 which exposes the surface of the wall to which the base 10 is mounted. The angle of the retention slot 34 is such that when the cable tie (not shown) is inserted, the tip of the cable tie contacts the surface of the wall through the opening 20 in the base 10 and continues forward into the opening 20 to enable easy grasp of the tip of the cable tie which is then directed through the cable tie locking mechanism and subsequently tightened around the incoming cable to secure the cable to the shelf 32.

The cable management enclosure includes a plurality of posts 36 formed in the base 10. Posts 36a formed in the interior of the base include a support member 38. As shown in FIG. 1, the cable management enclosure can accommodate 3 duplex connectors or 6 ports 41 for fiber optic cable connections. A faceplate that mounts in the cover of the cable management enclosure can accommodate 6 copper connections. Thus, the cable management enclosure of the present invention has a density of 6 fiber and 6 copper which is not available in the prior art discussed above. The outside posts 36b are formed on the side of the base and do not require additional support. Each post 36 includes at least one channel 40 that runs the length of the post 36. The channel 40 becomes narrow towards the bottom of the base 10 of the cable management enclosure. A slide-in adapter plate 42 (shown in FIGS. 6–8) is placed between the posts 36. The slide-in adapter plate 42 is designed to enable easy factory mounting of cable adapters 41 onto the slide-in adapter plate 42. As shown in FIG. 6, the slide-in adapter plate 42 has an opening 44 for receiving a cable adapter 41. The size and/or number of openings formed in the slide-in adapter plate 42 will vary depending upon the size and shape of the cable adapter. The slide-in adapter plate 42 also has a rib 46 that engages the channel 40 formed in the posts 36. Once the adapter is placed in the slide-in adapter plate 42, the slide-in adapter plate 42 is placed between posts 36 by aligning the ribs 46 with channels 40. The slide-in adapter panel 42 provides a stable/secure adapter mount, easy installation/ removal of the factory-loaded adapter plates into/out of the base 10, and assures that the proper orientation is achieved.

The industry standard method for securing an adapter is via the use of 2 screws fed through clearance holes in the adapter flange and then threaded into 2 tapped holes in the mounting surface. The slide-in adapter plate 42 uses 2 cylindrical posts 48 which provide 2 important benefits. The cylindrical posts 48 eliminate the need for screws and costly tapped holes in the mounting surface via the posts' diameter being such as to fit through the adapter flange holes (with clearance) and the posts' length being longer than adapter flange thickness. This feature is applicable to the type of adapter that does not use mounting clips. Once the adapter is installed against the mounting surface in adapter plate 42, with posts 48 through the adapter flange holes, the tops of these posts are subsequently mechanically swaged over to effect retention of adapter to the mounting surface of the adapter plate 42. The time to install an adapter into the adapter plate 42 is therefore reduced and other costs are reduced as well in that no tapped holes or screws are required. It is understood that the posts 48 need not be cylindrical but may be any shape as long as the posts fit through the holes provided in the adapter.

In addition, certain adapters are designed to be retained in a panel cut-out through metallic mounting clips. The types of adapters, however, have a tendency to rock within the panel cut-out. The posts 48 in the adapter plate 42 increase the stability any adapter (in particular, adapters designed with metal mounting clips). The posts 48 serve to eliminate or greatly reduce the "rocking" action which the clips by themselves allow due to the clearance between the panel and the clip edge. The posts 48, once within the adapter flange holes, limit the adapter from rocking because of the restriction provided by the presence and fit of the posts 48 into the adapter flange holes.

The slide-in adapter plate 42 facilitates the installation of adapters into an enclosure such as this cable management enclosure. The slide-in adapter plate 42 has been designed with a cut-out 44 that accommodates the adapter which is factory-installed and the resultant sub-assembly (or "loaded adapter plate") is supplied to the customer. The slide-in adapter plate 42 includes ribs 46 that are shaped to fit easily into corresponding channels 40 formed in the posts 36. These ribs 46 have a "Y" shape, that is the top of the rib is wider than the bottom of the rib as shown in FIG. 7. The channels 40 have a similar shape, but inverted. As shown in FIG. 5, the top of channel 40 is wider than the bottom of channel 40. When the slide-in adapter plate 42 is placed between two posts 36, the ribs 46 are led into the channels 40 due to the large clearance afforded between the bottom of the rib 46 and the top of the channel 40. As the slide-in adapter plate 42 descends, a slight interference between the rib 46 and the bottom of the channel 40 provides a snug fit for stability. In addition, the upper wide portion of rib 46 provides a slight interference fit with the upper wide portion of channel 40. The rib 46 and channel 40 may have shapes other those described and shown herein.

This shape of the rib 46 and channel 40 has additional benefits beyond providing a snug fit between the slide-in adapter plate 42 and the posts 36. A typical adapter (copper or fiber) is designed with some keying mechanism (e.g., a slot or studs) for the purpose aligning the mating connector (plug). It is desirable for this mechanism to be oriented in such a way as to be as visible as possible from the perspective of where the individual would be positioned when ready to mate a connector to the adapter. The factory installs the adapter to the slide-in adapter plate 42 with the keying mechanism (slot, stud, etc.) orientated towards the top of the slide-in adapter plate 42. The installer can easily identify the top of the slide-in adapter plate 42 by locating the wide part of rib 46. The wide portion of the rib 46 will not fit into the narrow portion of the channel 40. Therefore, the wide portion of the rib 46 must always be towards the top of post 36. If the keying mechanism of an adapter inserted into the slide-in adapter plate 42 is positioned facing the wide portion of rib 46, it is ensured that maintenance personnel will be able to view the keying mechanism when servicing the cable management enclosure.

The slide-in adapter plate 42 also provides for the reversibility of hybrid adapters. Hybrid adapters have a first type of mating interface at one end and a second type of mating interface at the other end. When the slide-in adapter plate 42 is placed between posts 36, one end of the adapter will extend out of the cable management enclosure and one end of the adapter will extend into the cable management enclosure. Because the slide-in adapter plate 42 is reversible, the customer can position the hybrid adapter so that either interface faces the outside of the cable management enclosure. It is understood that the shape of the rib and the channel are exemplary and one of ordinary skill in the art will appreciate that a variety of shapes will achieve the reversibility and position control of the slide-in adapter plate.

Figure 13:
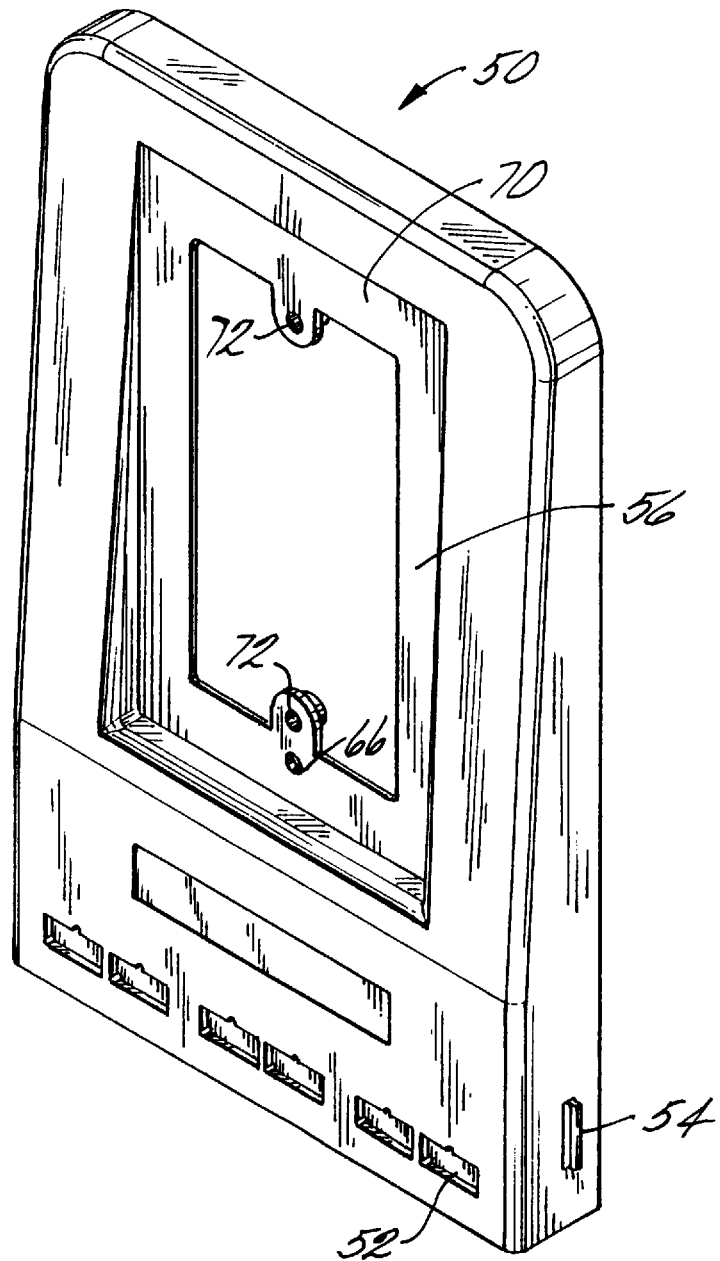
FIG. 13 is a perspective view of the cover.

FIG. 13 is a perspective view of the cable management enclosure cover, shown generally at 50, that snaps on to the cable management enclosure base 10 shown in FIG. 1. The sides of the cover 50 taper down to a flat area at the bottom which includes molded identification areas 52 for accepting an identification icon. The present invention provides identification areas for each port. The embodiment shown in FIG. 13 is designed for six fiber ports. The cover 50 includes a sunken faceplate mounting section 56 including a flange 70 which receives a standard faceplate. In an exemplary embodiment, the faceplate (not shown), cover 50 and base 10 are mounted to the wall box using standard screws positioned in holes 72. The molded identification areas 52 receive snap-fit, removable, color-coded fiber port identification tabs. Molded identification areas 52 are integral to the cable management enclosure cover, at the bottom, directly above each of the six fiber ports. These identification areas 52 accommodate standardized tabs which are available in a variety of colors and include an icon on one or both sides (such as computer, phone, etc.). This enables full color-coding and/or function identification for each port which is needed for non-duplex applications. As discussed previously, the enclosure sold under the brand name Mod-Tap includes identification for each set of two ports. Thus, more detailed identification can be achieved with the cable management enclosure cover 50 of the present invention.

Figures 9, 10:
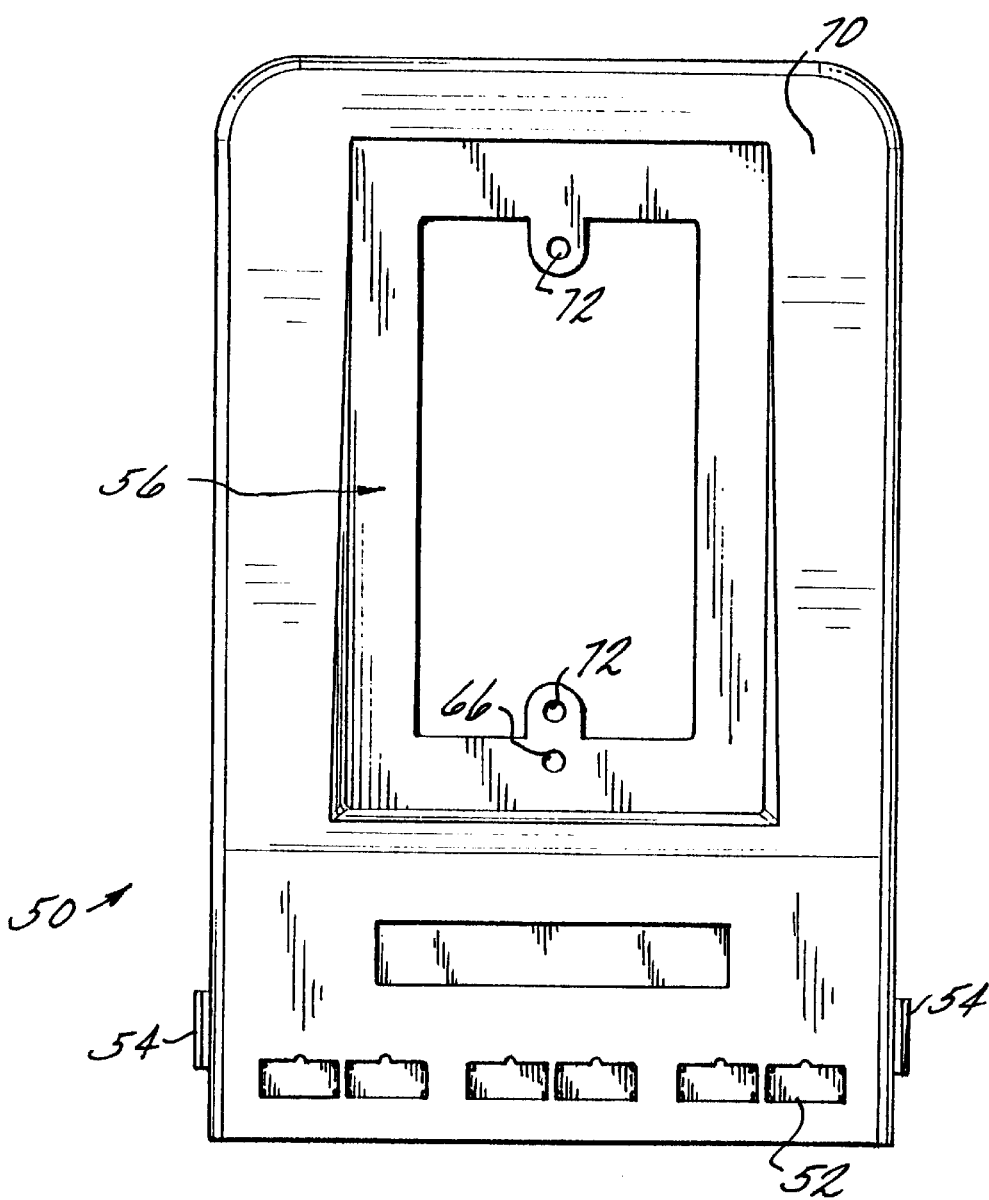
FIG. 9 is a front plan view of the cable management enclosure cover.
FIG. 10 is a top view of the cover.
Figure 11:
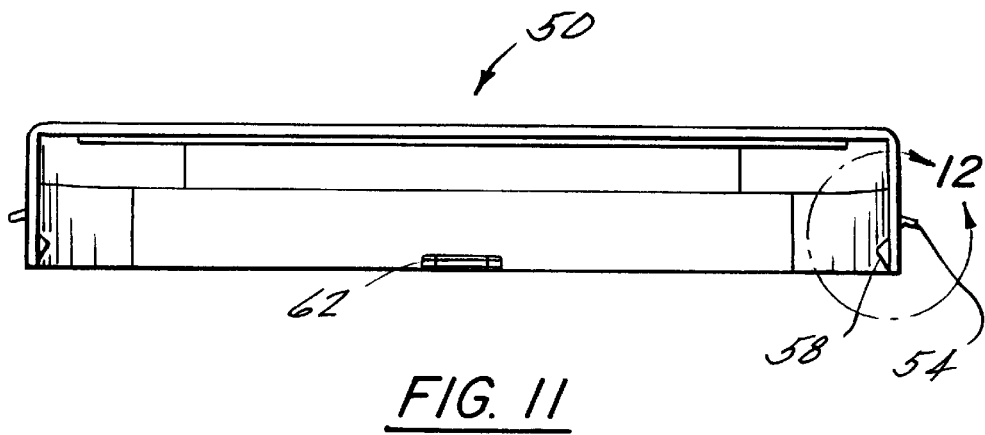
FIG. 11 is a bottom view of the cover.
Figure 12:
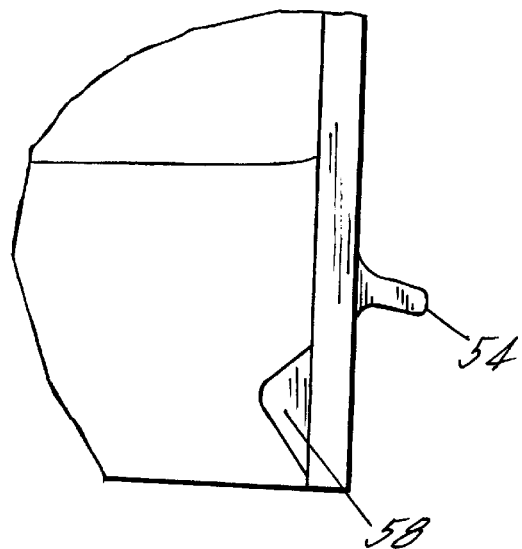
FIG. 12 is an enlarged view of a portion of the cover.

FIG. 9 is a front view of the cable management enclosure cover 50 and FIG. 10 is a top view. FIG. 11 is a bottom view of the cable management enclosure cover 50 illustrating the mechanism for snap fitting the cover 50 to the base 10. The cover 50 includes a pair of protrusions 58 formed on the inside wall of the cover 50. A tab 62 is formed on the inside of the cover 50 at the top of the cover 50. To mount the cover 50 to the base 10, the tab 62 is inserted into recess 64 (shown in FIG. 5). The cover 50 is then hinged down until the protrusions 58 engage the recesses 60 (shown in FIG. 5). To release the cover 50, release tab 54 is pressed to remove the protrusions 58 from the recesses 60. The cover is made from a resilient material, such as plastic, and flexes without degrading its structural properties.

Figure 14:
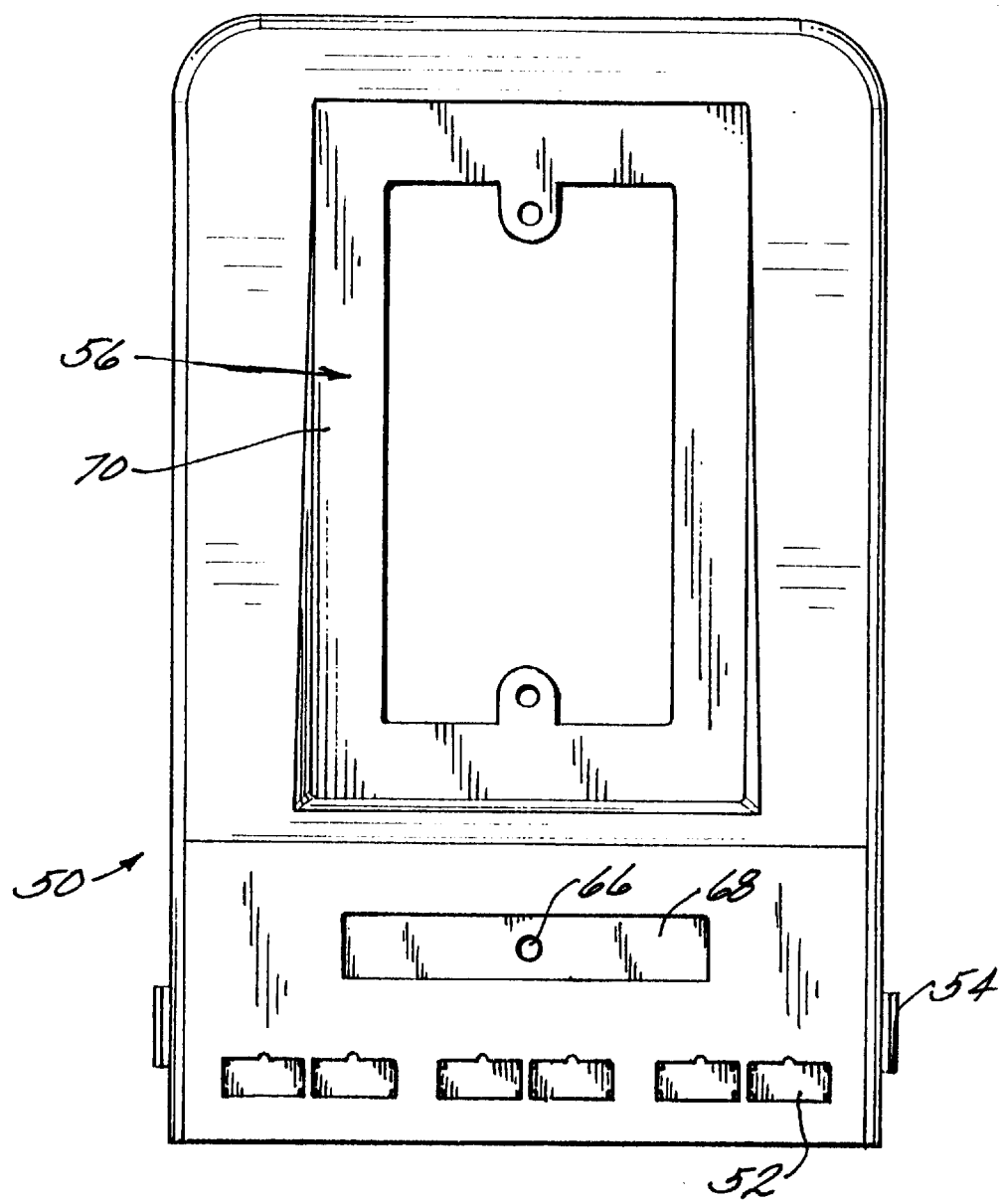
FIG. 14 is front view of a variation of the cover.

Although the protrusions 58, recesses 60, tab 62 and recess 64 hold the cover 50 to the base 10, it is often desirable to provide additional security. In order to prevent personnel from disturbing the cable in the cable management enclosure, a hole 66 is formed in the cover 50 for accepting a security screw (not shown). The hole 66 in the cover 50 corresponds to a boss 68 formed in the base 10. The boss has a hollow center for receiving self-tapping screw or may be threaded for receiving a threaded screw. This hole 66 is located such that when the faceplate is mounted in the faceplate mounting section 56, the hole 66 is concealed. Alternatively, holes for security screws may be provided at areas provided for labels. As shown in FIG. 14, a label area 68 is molded into the cover 50 and the security screw hole 66 is provided in the label area. A corresponding boss 68 is positioned on the base 10 to accept the security screw. A label is then inserted into the label area 68 to conceal the head of the security screw so as to reduce the possibility of an unauthorized individual removing the cover and thus exposing the connections within to potential damage. It is understood that one or more label areas 68 and security screws may be used.

Figure 15:
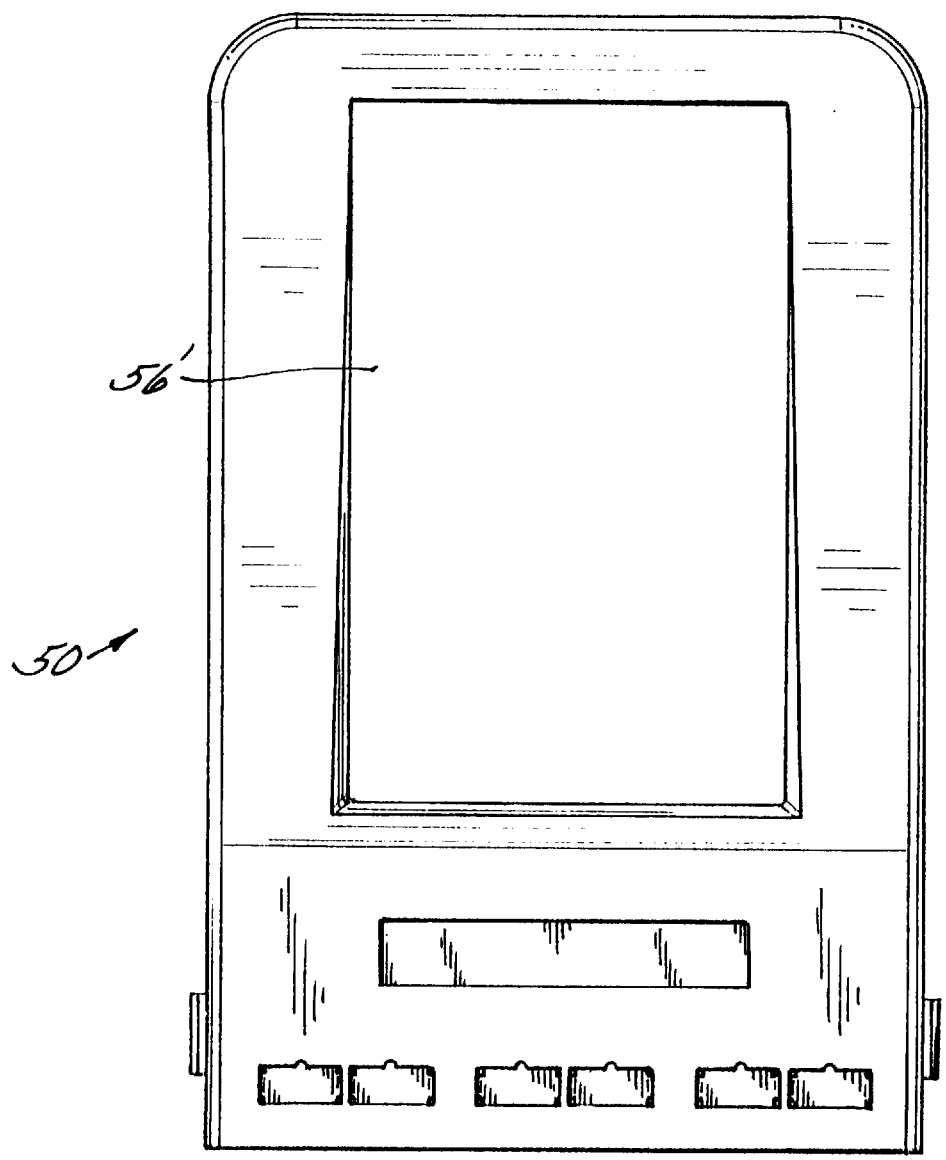
FIG. 15 is front view of a second variation of the cover.
Figure 16:
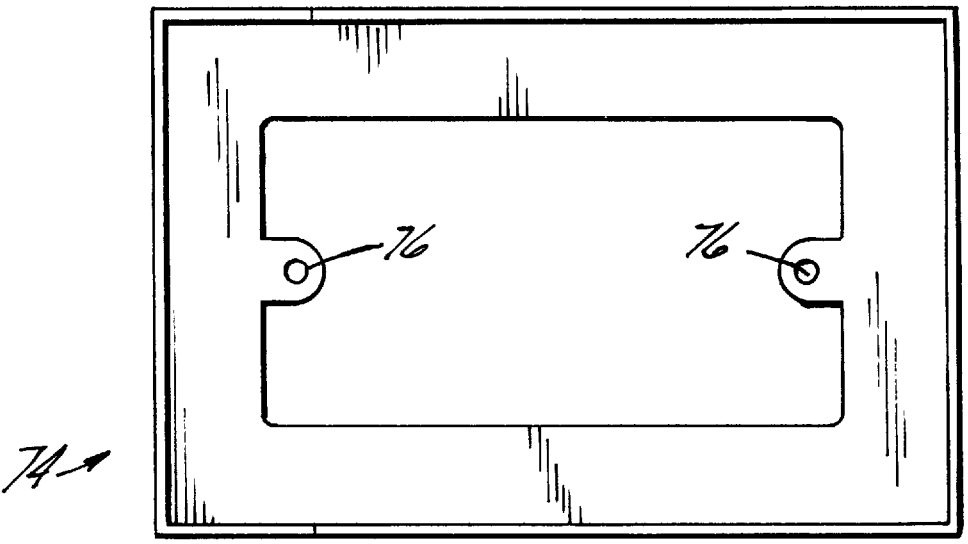
FIG. 16 is a top view of a dustplate.
Figure 17:
FIG. 17 is a side view of the dustplate.
Figure 18:
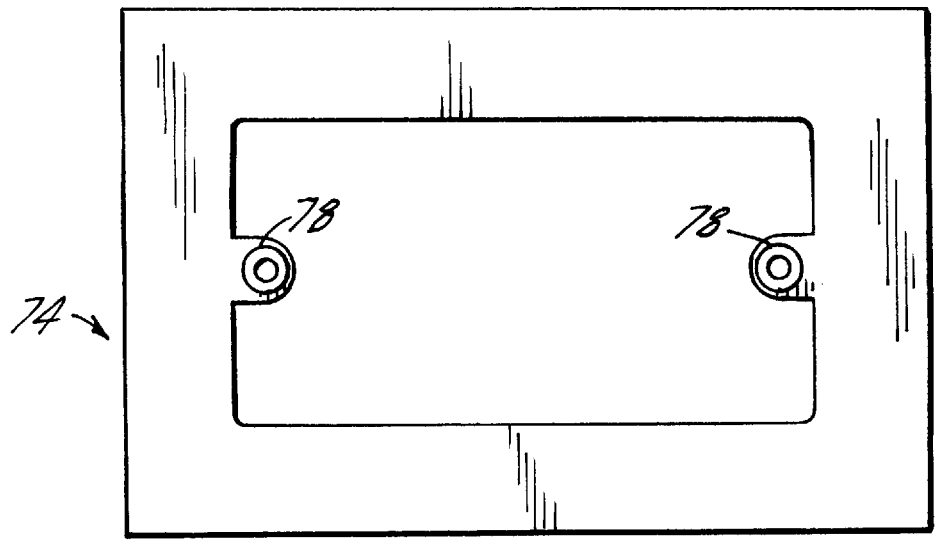
FIG. 18 is a bottom view of the dustplate.
Figure 19:
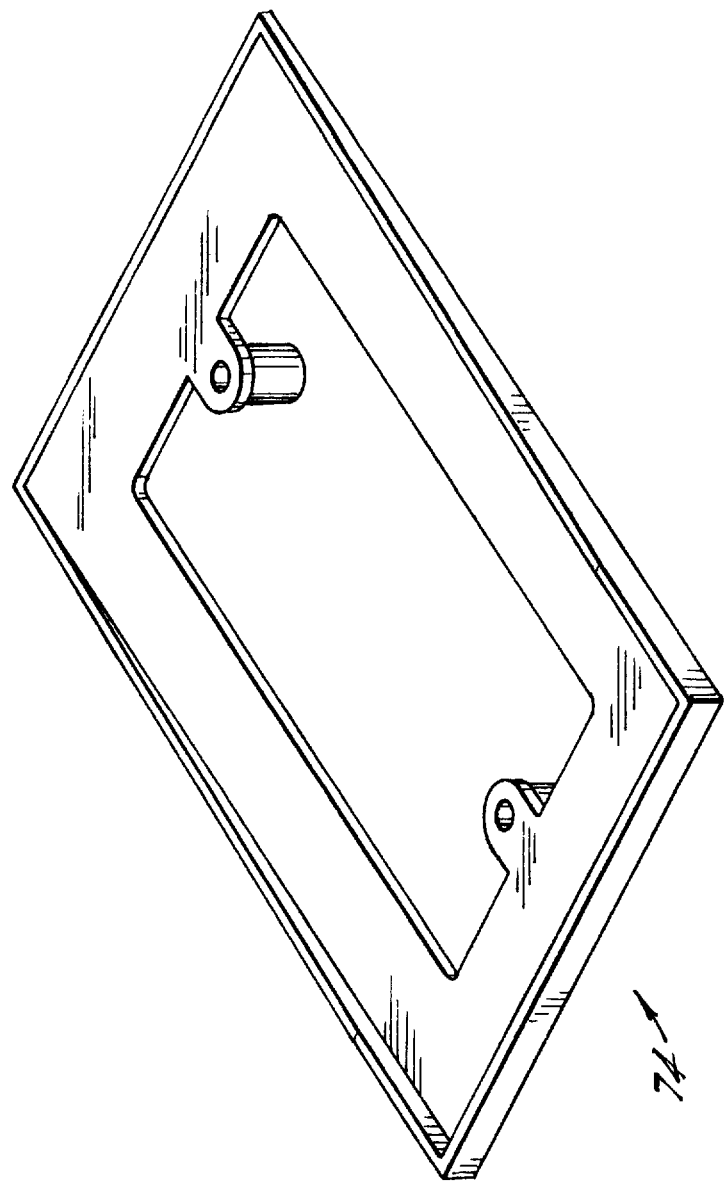
FIG. 19 is a perspective view of the dustplate.
Figure 20:
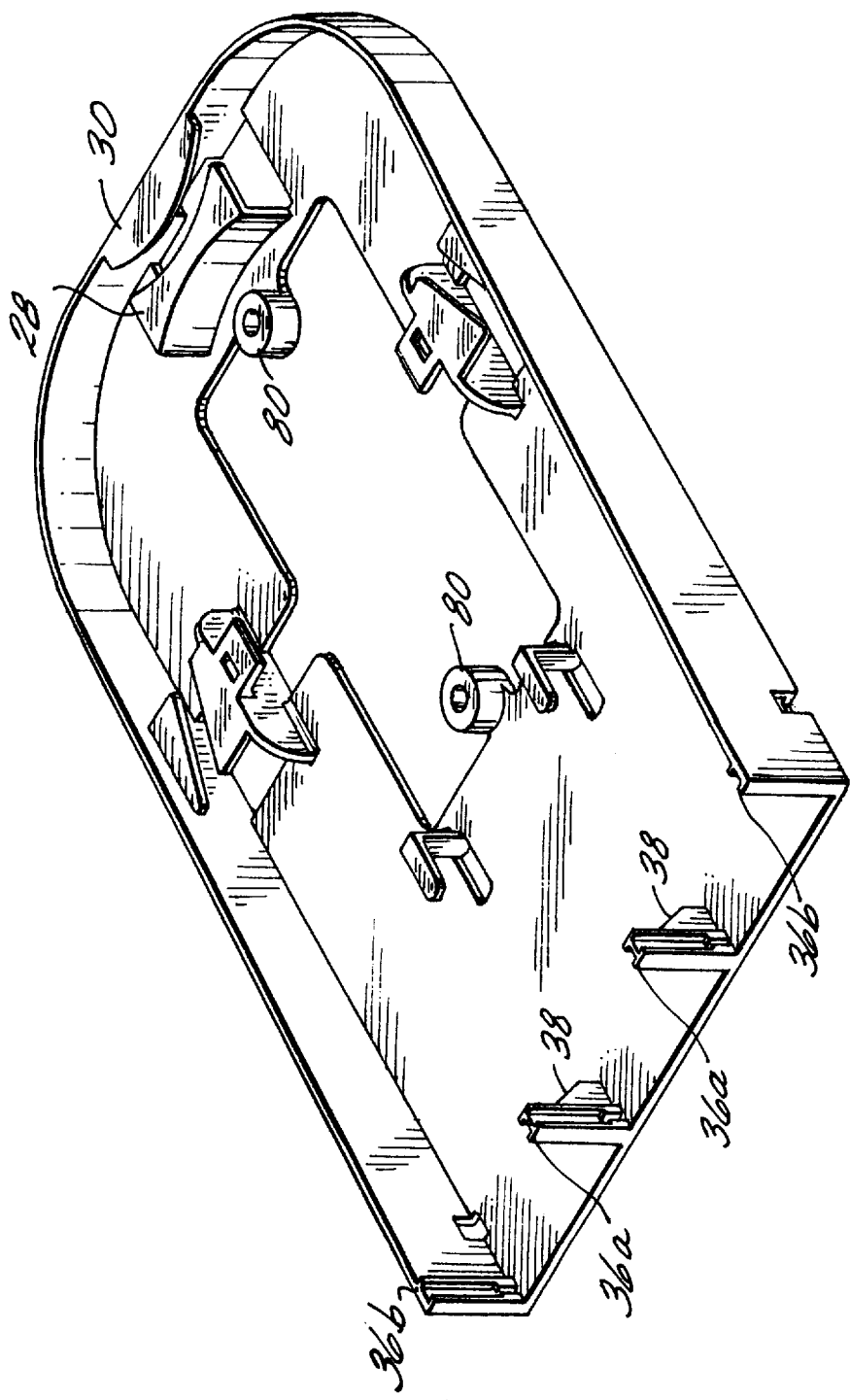
FIG. 20 is a perspective view of a variation of the base for use with the dustplate.

In the above described embodiment, in order to remove the cover 50, the faceplate positioned within the sunken faceplate mounting section 56 must be removed because the flange 70 has an interior dimension that is smaller than the exterior dimension of the faceplate. Once the cable management enclosure has been loaded with copper and fiber connections, there are occasional needs to re-open the box. The most common need is to re-clean the fiber connections (due to the degradational effect which dust or dirt has on transmission performance) and it is therefore desirable to be able to open the box in such a way that the faceplate and corresponding copper connections are not disturbed. In an alternative embodiment shown in FIG. 15, the flange 70 is either eliminated or reduced so that front opening 56' of cover 50 is larger than the faceplate such that, when the cover 50 is opened, the faceplate is cleared and remains attached to the base 10. This configuration, however, produces an air gap around the faceplate which is undesirable. To reduce the ingress of dust, a dustplate 74 is incorporated which fits into the base 10 and is larger than cover 50 opening to thus close off all gaps between the faceplate and the cover opening. FIGS. 16–19 are views of the dustplate 74. The dustplate includes two screw holes 76 for accepting a screw that connects the faceplate, the dustplate 74 and the base 10 to the wall box. This dustplate 74 is designed so as to be self-locating within the base via the use of screw bosses 78 whose outside diameter fits freely into the inside diameter of corresponding bosses 80 molded into the base 10 as shown in FIG. 20.

The hole 76 through the dustplate bosses 78 accommodates a standard wall box screw and, therefore, a single screw is all that is needed (one at the top and another at the bottom) to hold faceplate, dustplate 74, and cable management enclosure base 10 to the wall box. When the faceplate and dustplate 74 are installed, there is still ready access to the fiber connections at the bottom of the base 10 for re-cleaning purposes. The connectors are mated to the adapters which are installed into the slide-in adapter plates 42. Thus, to reclean, the slide-in adapter plate 42 is slid up and away from the base 10, the connector dis-engaged from the adapter, cleaned, re-engaged back into adapter(s), and then the slide-in adapter plate 42 is slid back into the base 10.

Figure 21:
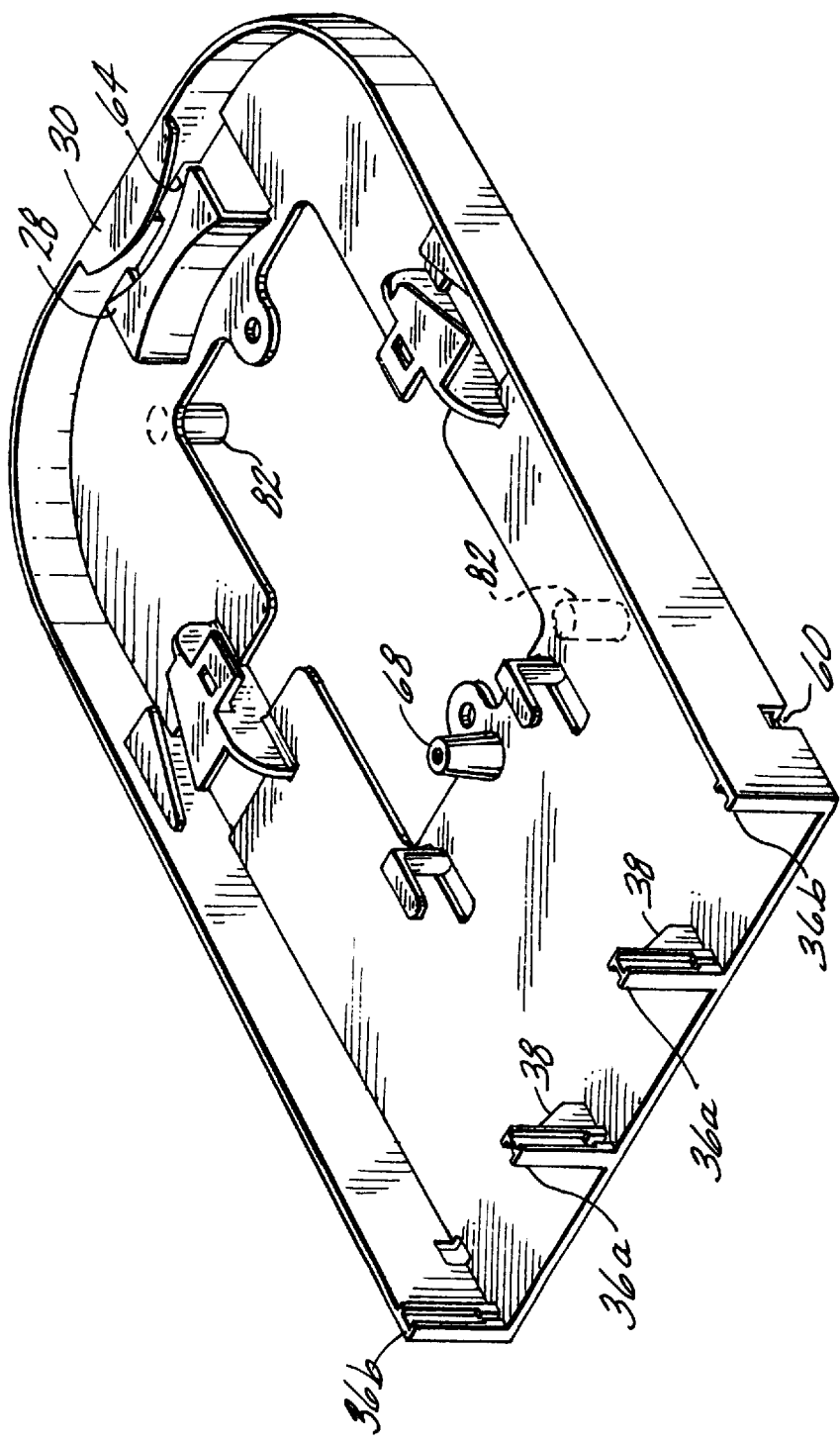
FIG. 21 is a perspective view of a base including locating bosses.

In mounting the base plate 10 to the wall box, it is desirable to provide a locating mechanism to position the base 10 relative to the wall box. As shown in FIG. 21, locating bosses 82 may be placed on the back side of the base 10 to align the base to the wall box. The base may optionally include double sided adhesive tape to aid in positioning the base 10 relative to the wall box. The locating bosses 82 may be placed so as to engage the corners of the wall box as shown in FIG. 21. It is understood that a variety of locations may be used for the locating bosses 82 so that wall boxes of different sizes may be accommodated. Alternatively, extra locating bosses 82 maybe provided on the back of the base 10. The installer would then simply snap off the unnecessary locating bosses 82. This provides a universal base plate 10 that can be modified in the field for installation to wall boxes of varying sizes.

Figure 22:
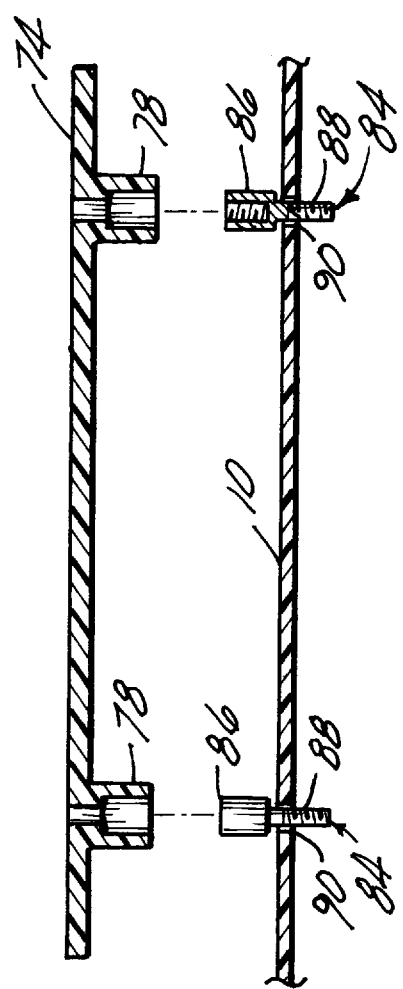
FIG. 22 is a cross sectional view of an alternative arrangement for mounting the base to a wall box.

FIG. 22 illustrates an alternative to the locating bosses 82 discussed above. FIG. 22 is cross sectional view of the base 10 and dustplate 74 in an alternative embodiment. The base 10 is mounted to the wall box using stand-off screws shown generally at 84. The stand-off screw 84 has a head 86 which includes a central threaded region. The stand-off screw 84 also includes a threaded screw portion 88. The base 10 is first mounted to the wall box by placing the stand-off screw 84 through hole 90 and engaging a threaded hole in the wall box. The dustplate 74 includes bosses 78 that surround the head 86. The faceplate and dustplate 74 may then be attached to the base 10 through a screw that engages the threaded head 86. The holes 90 may be placed at various locations in order to accommodate different wall boxes. Of course, the bosses 78 on the dustplate 74 are aligned with the holes 90 in the base 10.

The cable management enclosure is designed to provide superior cable management in a low-profile outlet box with fiber containment features that greatly facilitate the process of securing the incoming cable to the base and coiling the cable slack (up to 1 meter for each of the 6 connections). There is also sufficient space to accommodate up to (6) fiber and (6) copper connections and is designed in such a way as to not interfere with the mounted adapters/connectors. In addition, the adapters are supplied mounted to a slide-in adapter plate which easily slides in and out of the base for ready access to the connections. Another feature enables the faceplate to remain undisturbed if the box is re-opened for purposes such as the cleaning of fiber connections. Finally, the design is extremely functional and yet still relatively small.

While preferred embodiments have been shown and described, various modifications and substitutions may be made thereto without departing from the spirit and scope of the invention. Accordingly, it is to be understood that the present invention has been described by way of illustration and not limitation.

What is claimed is:

1. A cable management enclosure comprising:
    a cable tie down for providing a location at which to restrain a cable entering said cable management enclosure;
    an angled cable retainer for limiting movement of the cable within said cable management enclosure; and
    a curved cable retainer for limiting movement of the cable within said cable management enclosure,
    wherein said cable tie down comprises a cable tie down shelf including a retention slot formed therein, said retention slot being formed at an oblique angle relative to said cable tie down shelf.

2. The cable management enclosure of claim 1 wherein said cable tie down shelf is integral with said angled cable retainer.

3. A cable management enclosure comprising:
    a cable tie down for providing a location at which to restrain a cable entering said cable management enclosure;
    an angled cable retainer for limiting movement of the cable within said cable management enclosure;
    a curved cable retainer for limiting movement of the cable within said cable management enclosure;
    a plurality of posts each having a channel formed therein to define a plurality of channels; and
    an adapter plate having a rib formed on each end thereof, each said rib engaging a respective one of said channels to slidably mount said adapter plate to said posts;
    wherein said adapter plate further comprises at least one post extending therefrom.

4. A cable management enclosure comprising:
    a cable tie down for providing a location at which to restrain a cable entering said cable management enclosure;
    an angled cable retainer for limiting movement of the cable within said cable management enclosure;
    a curved cable retainer for limiting movement of the cable within said cable management enclosure;
    a plurality of posts each having a channel formed therein to define a plurality of channels; and
    an adapter plate having a rib formed on each end thereof, each said rib engaging a respective one of said channels to slidably mount said adapter plate to said posts wherein:
    said rib comprises a rib top portion and a rib bottom portion, said rib top portion being wider than said rib bottom portion; and
    said channel comprises a channel top portion; and
    a channel bottom portion, said channel top portion being wider than said channel bottom portion.

5. A cable management enclosure comprising:
    a cable tie down for providing a location at which to restrain a cable entering said cable management enclosure;
    an angled cable retainer for limiting movement of the cable within said cable management enclosure;
    a curved cable retainer for limiting movement of the cable within said cable management enclosure;
    a plurality of posts each having a channel formed therein to define a plurality of channels; and
    an adapter plate having a rib formed on each end thereof, each said rib engaging a respective one of said channels to slidably mount said adapter plate to said posts;
    wherein said adapter plate is reversible.

6. A cable management enclosure comprising:
    a plurality of posts each having a channel formed therein to define a plurality of channels; and
    an adapter plate having a rib formed on each end thereof, each said rib engaging a respective one of said channels to slidably mount said adapter plate to said posts;
    wherein said adapter plate further comprises at least one post extending therefrom.

7. A cable management enclosure comprising:
    a plurality of posts each having a channel formed therein to define a plurality of channels; and
    an adapter plate having a rib formed on each end thereof, each said rib engaging a respective one of said channels to slidably mount said adapter plate to said posts wherein:
    said rib comprises a rib top portion and a rib bottom portion, said rib top portion being wider than said rib bottom portion; and
    said channel comprises a channel top portion and a channel bottom portion, said channel top portion being wider than said channel bottom portion.

8. A cable management enclosure comprising:

a plurality of posts each having a channel formed therein to define a plurality of channels; and an adapter plate having a rib formed on each end thereof, each said rib engaging a respective one of said channels to slidably mount said adapter plate to said posts wherein said adapter plate is reversible.

9. A cable management enclosure comprising:

a base including cable retainers for managing cable within the enclosure; and a cover that engages said base, said cover including an opening through said cover for receiving a face plate; wherein:

said opening through said cover is larger than an external dimension of the face plate wherein said cover can be removed without removing said face plate and said cable management enclosure further comprises a dustplate positioned between said base and said cover, said dustplate having an opening for receiving the faceplate.

10. The cable management enclosure of claim 9 wherein:

said base further comprises a plurality of output ports; and said cover further comprises a plurality of identification areas, a number of said identification areas being equal to the number of said output ports.

11. The cable management enclosure of claim 9 wherein:

said base further comprises a boss for receiving a security screw; and said cover further comprises a hole that is aligned with said boss when said cover is attached to said base, said hole being located on said cover such that when the faceplate is mounted to said cover, said hole is concealed.

12. A cable management enclosure comprising:

a base including cable retainers for managing a cable within the enclosure; and a cover that engages said base, said cover including an opening for receiving a face plate wherein:

said base is mounted to a wall box and said base further comprises a plurality of alignment bosses for aligning said base to the wall box.

13. A cable management enclosure comprising:

a base including cable retainers for managing a cable within the enclosure; and a cover that engages said base, said cover including an opening for receiving a face plate, said opening in said cover is larger than an external dimension of the face plate and said cable management enclosure further comprises a dustplate positioned between said base and said cover, said dustplate having an opening for receiving the faceplate wherein:

said base further comprises a plurality of base bosses; and said dustplate further comprises a plurality of dustplate bosses that engage said plurality of base bosses.

14. A cable management enclosure comprising:

a base including cable retainers for managing a cable within the enclosure; and a cover that engages said base, said cover including an opening for receiving a face plate, said opening in said cover is larger than an external dimension of the face plate and said cable management enclosure further comprises a dustplate positioned between said base and said cover, said dustplate having an opening for receiving the faceplate wherein:

said base further comprises a plurality of base holes for receiving stand-off screws for mounting said base to a wall box; and said dustplate further comprises a plurality of dustplate holes aligned with said base holes.

15. A cable management enclosure comprising:

an angled cable retainer for limiting movement of a cable within said cable management enclosure;

a curved cable retainer for limiting movement of the cable within said cable management enclosure;

a plurality of posts each having at least one channel formed therein; and an adapter plate engaging said at least one channel to slidably mount said at least one adapter plate to said posts, wherein said adapter plate is reversible.

16. A cable management enclosure comprising:

a plurality of posts each having at least one channel formed therein; and an adapter plate engaging said at least one channel to slidably mount said adapter plate to said posts, wherein said adapter plate is reversible.

17. A cable management enclosure comprising:

an angled cable retainer for limiting movement of a cable within said cable management enclosure;

a curved cable retainer for limiting movement of the cable within said cable management enclosure;

a plurality of posts each having at least one channel formed therein; and an adapter plate engaging said at least one channel to slidably mount said adapter plate to said posts;

wherein said adapter plate further comprises at least one post extending therefrom.

18. A cable management enclosure comprising:

a plurality of posts each having at least one channel formed therein; and an adapter plate engaging said at least one channel to slidably mount said adapter plate to said posts;

wherein said adapter plate further comprises at least one post extending therefrom.

19. A cable management enclosure comprising:

a base;

a cover mounted to said base;

a cable tie down on said base for providing a location at which to restrain a cable entering said cable management enclosure; and at least one cable retainer for limiting movement of the cable within said cable management enclosure;

wherein said cable tie down comprises a cable tie down shelf including a retention slot formed therein, said retention slot being formed at an oblique angle relative to said cable tie down shelf.

20. A cable management enclosure comprising:

a base including cable retainers for managing a cable within the enclosure; and a cover that engages said base;

wherein said base is mounted to a wall box and said base further comprises a plurality of alignment bosses for aligning said base to the wall box.

* * * * *

UNITED STATES PATENT AND TRADEMARK OFFICE
CERTIFICATE OF CORRECTION

PATENT NO. : 5,804,765
DATED : Sep. 8, 1998
INVENTOR(S) : John A. Siemon et al

It is certified that error appears in the above-identified patent and that said Letters Patent is hereby corrected as shown below:

Column 2 line 17 insert --a-- between "is" and "front"

Column 2 line 18 insert --a-- between "is" and "front"

Column 4 line 2 delete "2" insert --two--

Column 4 line 52 insert --than-- between "other" and "those"

Column 4 line 57 insert --of-- between "purpose" and "aligning"

Column 8 line 21 delete "an" insert --at least one--

Column 8 line 23 insert --at least one-- between "said" and "adapter"

Signed and Sealed this

Tenth Day of October, 2000

Attest:

Q. TODD DICKINSON

*Attesting Officer*

*Director of Patents and Trademarks*